(12) United States Patent
Jiang et al.

(10) Patent No.: US 9,492,978 B2
(45) Date of Patent: Nov. 15, 2016

(54) METHOD OF MAKING OPHTHALMIC LENSES WITH A STRUCTURED SURFACE

(75) Inventors: Peiqi Jiang, Tarpon Springs, FL (US); Bruce Keegan, Seminole, FL (US)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 446 days.

(21) Appl. No.: 13/977,974

(22) PCT Filed: Jan. 4, 2011

(86) PCT No.: PCT/US2011/020102
§ 371 (c)(1),
(2), (4) Date: Jul. 2, 2013

(87) PCT Pub. No.: WO2012/093994
PCT Pub. Date: Jul. 12, 2012

(65) Prior Publication Data
US 2013/0278892 A1 Oct. 24, 2013

(51) Int. Cl.
*B29D 11/00* (2006.01)
*G02C 7/02* (2006.01)

(52) U.S. Cl.
CPC ..... *B29D 11/00028* (2013.01); *B29D 11/0073* (2013.01); *B29D 11/00269* (2013.01); *B29D 11/00865* (2013.01); *G02C 7/022* (2013.01); *Y10T 156/10* (2015.01)

(58) Field of Classification Search
CPC .................. B29D 11/00028; B29D 11/00269; G02C 7/022
USPC ....................................................... 156/331.7
See application file for complete search history.

(56) References Cited

U.S. PATENT DOCUMENTS

| | | |
|---|---|---|
| 4,818,624 A | 4/1989 | Downey, Jr. |
| 2004/0263982 A1 | 12/2004 | Ishii |
| 2005/0140033 A1 | 6/2005 | Jiang et al. |
| 2007/0296094 A1 | 12/2007 | Jiang et al. |
| 2008/0000947 A1 | 1/2008 | Derrien et al. |
| 2009/0165932 A1 | 7/2009 | Biteau et al. |

(Continued)

FOREIGN PATENT DOCUMENTS

| | | |
|---|---|---|
| EP | 0 614 957 | 9/1994 |
| EP | 1 701 838 | 9/2006 |

(Continued)

OTHER PUBLICATIONS

International Search Report dated Aug. 14, 2012, corresponding to PCT/US2011/020102.

*Primary Examiner* — Daniel Lee
(74) *Attorney, Agent, or Firm* — Young & Thompson

(57) ABSTRACT

A method for fabricating a Fresnel lens or other lens having a structured surface such as refractive and/or diffractive bi-focal or other multi-focal lenses includes press-coating the structured surface with a low or very low refractive index coating material. The coating is sufficient thick to adequately cover the structured surface so that a smooth coating surface with good optical properties is obtained, for example in the case of a Fresnel structure a thickness greater than 1.5 times and less than 5 times the Fresnel structure height, and is cured in situ. A film, e.g., of PET, PC or PU or a film stack, e.g. a TAC/PVA/TAC film stack is prepared and a heat melting adhesive is applied to the side of the film or film stack to be contacted with the coated structured surface of the lens blank. The film or film stack is then laminated to the cured coating.

27 Claims, 2 Drawing Sheets

(56) References Cited

U.S. PATENT DOCUMENTS

2009/0291206 A1* 11/2009 Jiang ................ B29D 11/00865
                                                    427/164
2010/0110567 A1* 5/2010 Glacet ................ B29D 11/0073
                                                    359/742

FOREIGN PATENT DOCUMENTS

| EP | 1 830 204 | 9/2007 |
|----|-----------|--------|
| JP | 6 174904  | 6/1994 |
| WO | 2009/079342 | 6/2009 |
| WO | 2009/141376 | 11/2009 |

* cited by examiner

METHOD OF MAKING OPHTHALMIC LENSES WITH A STRUCTURED SURFACE

FIELD OF THE INVENTION

The present application relates to ophthalmic lenses having a structured surface, such as Fresnel lenses and bi-focal and other multi-focal lenses (the latter also known as "plano lenses with power") and in particular but not exclusively polarized ophthalmic lenses having a structured surface such as Fresnel lenses and bi-focal and other multi-focal lenses, and a method for making such ophthalmic lenses having a structured surface and in particular but not exclusively for prescription sunglass applications.

BACKGROUND OF THE INVENTION

There is an increasing interest in adopting Fresnel lenses which are diffractive lenses for certain ophthalmic applications in lieu of more conventional refractive lenses. Among the reasons for the increased interest in Fresnel lenses for ophthalmic applications is to increase lens optical power and/or reduced lens thickness and therefore they are also referred to as "thin lenses with high power". One problem which has slowed the industrial development of Fresnel lenses for ophthalmic applications is related to their fabrication. A Fresnel lens conventionally has a so-called structured surface or side including a plurality of concentric ridges of different thickness and dihedral angles which collectively focus the lens and a non-structured surface or side. Fresnel lens like refractive lenses may have a variety of powers. The structured surface of the Fresnel lens can be provided on a planar, convex or concave side thereof.

While it is possible to use an uncoated Fresnel lens as an ophthalmic lens, an uncoated structured side is the source of a host of problems, relating to the structured surface or side of the lens being both unsightly when worn and impractical from the standpoint of user care. To avoid such drawbacks it has been generally agreed that the structured surface or side of the Fresnel lens needs to be coated for reasons of aesthetics and ophthalmic lens care.

The coating of the structured surface or side of a Fresnel lens poses a significant problem in the fabrication of Fresnel lenses for ophthalmic applications. Conventional coating processes widely employed for coating ophthalmic lenses such as spin coating, dip coating or flow coating are inapplicable for coating the structured surface or side of a Fresnel lens because such conventional coating processes cannot be adapted to produce acceptably smooth coated structured surfaces, substantially devoid of waviness.

Various techniques are known for use in making Fresnel lenses which include a layer overlying the structured surface of the Fresnel lens. These techniques include overmolding, casting and BST (back side transfer). Fresnel lens structures with a layer covering the structured surface are disclosed in EP 1 830 204, US2008/00947 and US2004/0263982. None of these disclose a fully satisfactory process for producing coated Fresnel lenses devoid of optical and cosmetic defects, especially when the Fresnel structure height of the lens is in excess of 30 µm.

It has been discovered that it is possible to achieve good quality coating of the structured surface or side of a Fresnel lens from the optical and 'cosmetic' standpoints with a so-called "press coating" process such as disclosed in the assignee's published application EP 1 701 838 and counterpart U.S. published patent applications US2005/140033 and US2007/296094, the contents of which are incorporated by reference.

The foresaid patent applications teach the coating of fined (or fine ground) lens blanks to avoid having to polish the lens blank which is a lengthy and costly step in the fabrication of ophthalmic lenses. The unpolished lens blank typically has a roughness (Rq) from 0.01 to 1.5 µm and most commonly about 0.5 µm. A cured coating 1 to 50 µm thick and more commonly less than 5 µm is applied to the unpolished fined lens surface in accordance press coating process disclosed therein.

In the press coating process a requisite amount of a liquid, curable coating composition is deposited on a molding surface of a coating mold part or the unpolished fined surface of the lens blank to be coated. The mold part has a matching curvature to that of the unpolished fined surface of the lens blank. In practice the lens blank is mounted on a balloon, bladder or other inflatable membrane in communication with an air accumulator connected to a source of pressurized air. The pressurized air supplied to the accumulator expands the balloon or bladder to apply the lens blank against the matching surface of the mold surface with a pressure of about 84 kPa (or about 12.2 psi) thereby spreading the curable coating liquid uniformly over the unpolished fined lens blank surface. Thereafter the coating liquid is cured in situ and the pressure is released and the coated lens blank is removed from the mold. The resulting coated lens has very good light transmission and low haze and eliminates visible fining lines when examined with an arc lamp.

Given the topology of the structured surface of a Fresnel lens the press coating process for an unpolished fined lens blank surface is not directly applicable. In fact attempts at applying press coating process to the coating of the structured side of surface of a Fresnel lens revealed two kinds of defects, so-called cosmetic defects and optical defects.

These defects are caused by shrinking of the coating composition applied to the Fresnel lens blank during curing of the coating composition: the greater the Fresnel structure height the greater resulting shrinkage of the coating composition.

It is advantageous to have a thin coating on Fresnel lenses in order to reduce the overall thickness of the resulting lens. But coatings not thick enough to cover satisfactorily the structured surface of the Fresnel lens blank produced surfaces which were not acceptably smooth to provide good optical quality. While good surface quality can be obtained with coatings of the order of 1 to 2 mm such coating thicknesses are detrimental to the desired reduced overall thickness of the lens.

Another problem encountered was the formation of so-called cosmetic ring void defects, which occur in the peripheral region of the coated structured side of the Fresnel lens blank and consist of rings or non-circular irregular contour lines of variable radial distances from the centre of the lens blank such that the rings or contours lines intersect one another at one or more locations.

Copending U.S. patent application Ser. No. 12/651,646 filed Jan. 4, 2010, assigned to the assignee/applicants of the present application, the content of which is incorporated by reference, teaches that it is possible to obtain a good optical surface quality with an acceptably smooth coated structured surface, that is reduced surface roughness, without excessively thick coatings of the order to 1 or 2 mm, by adapting the coating to the height of the structured surface or Fresnel surface of the Fresnel lens and specifically by adopting coating thicknesses which are greater than about 1.5 times the height of structured surface, or the Fresnel structure height, but less than about 5.0 times the height of the structured surface, or Fresnel structure height, of the lens. In practice the resulting surface roughness can be made equal to or even less than 300 nm. This results in coating thicknesses in the range of about 100 to about 600 μm.

Copending U.S. patent application Ser. No. 12/651,646 also teaches the cosmetic ring void defects could be totally eliminated by directing incident radiation, here UV radiation, at the Fresnel lens and not at the glass mold contrary to conventional curing procedure. The application teaches that the coatings in the range of thickness between about 100 and about 600 μm are particularly sensitive to shrinkage.

According to the aforesaid copending application directing the incident UV radiation to the Fresnel lens the shrinkage develops in the direction opposite to that of the incident radiation. Thus with shrinkage developing from the smooth glass mold surface towards the Fresnel structure surface, shrinkage is uniform and produced an acceptably smooth surface. As a result, no irregular shrinkage rings or ring void defects are visible. The copending application also teaches that when the incident UV radiation is directed at the glass mold, the shrinkage of the coating liquid develops from Fresnel structure surface, again in a direction opposite to that of the incident radiation and results in visible irregular shrinkage rings or ring void defects caused by the development of shrinkage from the irregular Fresnel surface of the lens.

According to the invention disclosed in copending application Ser. No. 12/651,646 there is provided a method for coating a Fresnel lens or lens blank, e.g. for use as a ophthalmic lens blank, comprising providing a Fresnel lens blank having a structured surface and a non-structured surface, providing a transparent mold part having molding surface substantially matching the base curvature of the Fresnel lens, depositing a metered quantity of coating resin or coating material between the molding surface and the structured surface of the Fresnel lens, applying pressure between the Fresnel lens blank and the mold part while maintaining the distance between the molding surface and the structure surface so that the thickness of the coating is between about 1.5 and about 5 times the height of the structured surface, or the Fresnel surface height, and about 5 times the height of the structured surface, or Fresnel surface height, and curing the resin coating in situ by directing the incident UV radiation at the Fresnel lens side, not at the glass mold side.

One or more the following features may also be adopted in such a process.

The pressure applied between the mold and the Fresnel lens blank may be between about 2 and about 5 psi (or about 13.8 and about 34.5 kPa).

The thickness of the coating may be between about 1.5 times the Fresnel structure height and about 5 times, or preferably 3 times, the Fresnel structure height.

The coating thickness may be between about 75 and 750 μm.

The Fresnel structure height of the Fresnel lens blank may be between about 20 μm and about 500 μm.

A plurality of circumferentially spacers may be disposed between the mold and the Fresnel lens having an axial length between about 80 and about 800 μm and particularly between about 100 and about 600 μm.

The difference in the refractive index of the Fresnel lens bulk material and the cured coating material may be greater than 0.05, greater than 0.06 and preferably greater than 0.10, or even greater than 0.15.

The refractive index of the cured coating material may be between about 1.45 and about 1.55, and even between 1.38 and 1.55 and the refractive index of the bulk material of the Fresnel lens blank is between about 1.59 and about 1.74.

The coating formulations (or coating materials) may be UV curable compounds selected from the group consisting of UV curable (meth)acrylic compounds, epoxy acrylic compounds, epoxy compounds, polyurethane acrylic compounds, fluoro-acrylic compounds, and any mixture of the aforesaid compounds. The Fresnel lens bulk material may be thermoplastic or thermosetting transparent polymer, and preferably a thermoplastic polycarbonate or a thermosetting polymer formed by curing compounds comprising thiourethane group(s) and/or episulfur group(s).

Typically the hardness of the coating may be between about 60 Shore A. and about 90 Shore A and the surface roughness of the cured coating material may be between about 0.01 μm and about 1.5 μm The elastic modulus of the cured coating may be greater than 4 mPa.

The difference in the refractive index of the Fresnel lens bulk material and the cured inner coating material may be between about 0.05 and about 0.40, and particularly between about 0.10 and about 0.35, even more particularly between about 0.15 and about 0.30.

The refractive index of the cured inner coating material may be between 1.38 and 1.55, and more particularly between 1.40 and 1.50 to provide a wide-range of optical power, and the refractive index of the bulk material of the Fresnel lens blank may be between 1.59 and 1.74.

The inner coating material may be, for example, UV curable fluorinated (meth)acrylic formulation such as MY-1375.

Bi-focal, tri-focal and other multifocal ophthalmic lenses, including refractive and/or diffractive bi-focal, tri-focal and other multifocal ophthalmic lenses suffer from the drawback of refractive lenses in general, namely that of increased thickness, which in the case of such lenses is typically located at the near and/or middle vision segment(s), compared with the relatively reduced thickness of the (typically) distance vision zone.

One way of reducing the thickness of the near and middle vision segment(s) or insert(s) is use a higher refractive index material for that segment. For that purpose the lens blank has a structured surface or side with a recess to accommodate a segment made of a different (and normally higher index material) and bonding the segment in the recess to the structured surface of the lens blank. Such a process requires a relatively large number of steps and therefore increases manufacturing costs.

Air-encapsulated Fresnel lenses are known and they high optical power owing to the large difference of the refractive index of the bulk material of the lens and that of air. Such air-encapsulated Fresnel lenses have very high haze levels and also require a specific type of frame for mounting the same for use as eyeglasses.

WO2009/079342 inter alia discloses a bi-focal or multifocal ophthalmic lens comprising one for more diffractive visions zones. A resin layer can be cast on top of the structured surface of the preform to form a multifocal lens. The resulting ophthalmic lens has a relatively low optical power.

OBJECT AND SUMMARY OF THE INVENTION

The object of the present invention is a method of fabricating ophthalmic lenses having a structured surface, such as a Fresnel ophthalmic lenses or a refractive and/or diffractive bi-focal or other multi-focal ophthalmic lenses including polarized prescription lenses, also known as prescription sunglass lenses, and the resulting bi-focal and other multi-focal prescription lenses and polarized bi-focal and other multi-focal prescription lenses.

According to one aspect of the present invention a method is provided for fabricating an ophthalmic lens, such as a Fresnel ophthalmic lens, or a refractive and/or diffractive bi-focal or other multi-focal ophthalmic lens, comprising the steps of: providing an ophthalmic lens blank made of a suitable transparent optical quality material; the ophthalmic lens blank having a structured surface and a non-structured surface; applying a coating to the structured surface of the ophthalmic lens blank and curing the coating in situ on the lens blank, the cured coating having a low or very low refractive index; and providing a relative rigid film or film stack, and laminating or bonding the film or film stack to the low or very low refractive index coating.

The invention may also include one or more the following features:

The lamination of the film or film stack may include the application of an adhesive to a selected "inner" surface of the film or film stack and the application of pressure when the adhesive on the film or film stack is brought into contact with the low or very low refractive index coating.

The relatively rigid film or film stack may have a Young's modulus in the range between about 2,200 and about 5,600 MPa (at 23° C.) for example in the case of a TAC film stack about 3,300 MPa (at 23° C.).

The relatively rigid film or film stack may exhibit a polarized function and may be an encapsulated polarized PVA (polyvinyl alcohol) layer and in particular a TAC/PVA/TAC stack or film comprising successive layers of triacetate cellulose (TAC), polyvinyl alcohol (PVA) and triacetate cellulose (TAC), or a CAB/PVA/CAB stack or film comprising successive layers of cellulose acetate butyrate (CAB), polyvinyl alcohol (PVA), cellulose acetate butyrate (CAB), or, PC/PVA/PC comprising successive layers of polycarbonate (PC), polyvinyl alcohol (PVA), and polycarbonate (PC), and polarized polyethylene terephthalate (PET) wherein the polarization is obtained by specific treatment (addition of iodine or dichroic dyes) to a stretched PET film of. Such a polarized PET film is well known in the art.

Any of the foregoing TAC/PVA/TAC CAB/PVA/CAB, or PC/PVA/PC stack or multi-layer film or polarized PET may be used for fabricating a polarized ophthalmic lens. In the case of the film stack the PVA layer requires special treatment to provide the desired polarized characteristics, such as disclosed in U.S. Pat. No. 4,818,624 and/or the patents cited therein (col. 1, lines 40-55), which are incorporated herein by reference.

Alternatively and notably where the ophthalmic lens to be fabricated is not a polarized ophthalmic lens the relatively rigid film does not require a stack or multilayer film configuration as above. Specifically the relatively rigid film may comprise a film of polyethylene terephthalate (PET), a film of thermoplastic polycarbonate (PC) or a film of thermoplastic polyurethane (PU) for example.

The "inner" surface of such a film or film stack may be coated with a suitable adhesive for securing by adhesion the film or film stack or multilayer film to the coating on the structured surface of the lens blank. The other or outer surface of this film or film stack may receive any coating or coatings (including conventional coatings) suitable for ophthalmic lenses such as for example anti-abrasion, anti-reflection, anti-soiling, anti-static, and/or anti-fogging coatings.

An example of a suitable commercial ant-reflective film is ARclear®DEV-8796 available from Adhesives Research, Inc. and comprises a PET film having a thickness of 75 μm and coated with a layer of pressure sensitive adhesive (PSA) having a thickness of 25 μm. An example of a suitable multi-functional film is available from Eyesaver and comprises a TAC film having a thickness of 80 μm and on one face thereof a hard multi-coat (HMC) stack (anti-scratch coating, anti-reflecting coating, anti-soiling or dirt-repellent coating) and on the other face thereof a layer of adhesive substance (pressure-sensitive adhesion).

When ophthalmic lens blank comprises a Fresnel lens blank, the coating applied to a structured surface of the Fresnel lens blank, may have a thickness greater than 1.5 times the Fresnel structural height of the structured surface and less than 5 times of the Fresnel structural height of the structured surface. In particular the thickness of the low or very low index coating may be between about 1.5 times the Fresnel structural height and about 3 times the Fresnel structural height, for example, between about 75 and about 750 μm.

Typically the Fresnel structural height of the structured surface of the Fresnel lens blank may be between about 20 μm and about 500 μm.

The difference in the refractive index of the Fresnel or other structured surface lens blank bulk material and the cured coating material may be between 0.05 and about 0.40 and in particular between about 0.10 and about 0.35 and more particularly between about 0.15 and about 0.30.

In an embodiment the refractive index of the low or very low index coating may be between about 1.38 and about 1.55 and the refractive index of the bulk material of the ophthalmic lens blank is between about 1.59 and about 1.74.

Coating formulations for producing the low or very low index coating may be UV curable compounds selected from the group consisting of UV curable (meth) acrylic compounds, epoxy acrylic compounds, epoxy compounds, polyurethane acrylic compounds, fluoro-acrylic compounds, and any mixture of the aforesaid compounds.

The lens bulk material may be a thermoplastic polycarbonate or a thermosetting polymer formed by curing compounds comprising thiourethane group(s) and/or episulfur group(s).

BRIEF DESCRIPTION OF THE DRAWINGS

Features and advantages of the present invention will be brought out in the following description, given by way of non-limiting examples, with reference to the accompanying drawings in which.

DETAILED DESCRIPTION OF EMBODIMENTS OF THE INVENTION

Figure 1:
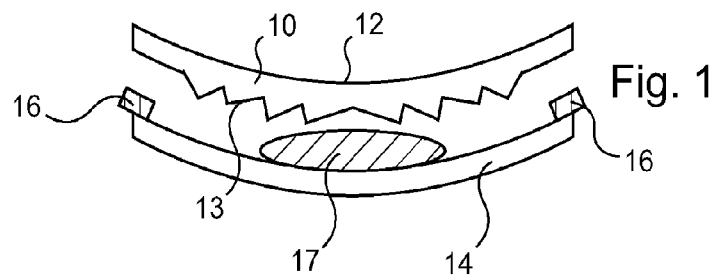
FIG. 1 is a schematic axial sectional view of a mold for press-coating a coating on a Fresnel lens blank, in an open position after depositing a metered amount of coating resin or material on the molding surface of a mold part.
Figure 2:
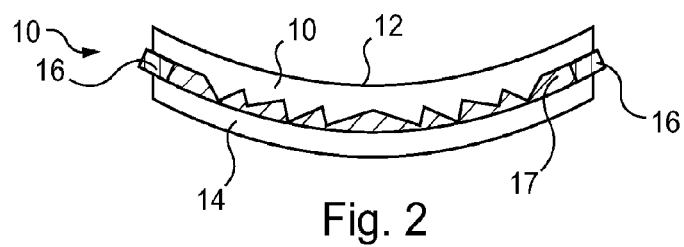
FIG. 2 is a schematic axial section of the coating mold of FIG. 1, after closing the mold.

The present method of fabricating ophthalmic lens blanks is intended for fabricating Fresnel lens blanks, diffractive and/or refractive bi-focal, and other multi-focal lens blanks for use as eyeglass lenses and including polarized ophthalmic prescription lens blanks, including polarized Fresnel lens, polarized refractive and/or diffractive bi-focal, tri-focal and other multi-focal lens blanks for prescription sunglass lenses.

The lens blank bulk material may be any high refractive index (nd) mineral glass or plastic material such as those widely used for the ophthalmic lenses and in particular polyurethanes or polythiourethanes with a refractive index ranging from 1.60 to 1.67 or polymers formed from episulfide monomers with a refractive index of 1.74, or polycarbonates having a refractive index (nD) of about 1.59.

In the case of a Fresnel lens blank 10 has a structured surface or side 13 having a plurality of concentric Fresnel ridges of suitable design to provide the desired optical properties such an optical power, Fresnel power or diffractive power, of suitable Fresnel lens design.

The Fresnel structure or relief profile has a height or so-called Fresnel structure height which is measured between the base curve of the structured surface of the lens and the maximum peak of the plurality of ridges defining the Fresnel surface. For ophthalmic applications the Fresnel structure height is preferably between about 20 µm and about 500 µm. The Fresnel power of an uncoated structured lens is preferably between +/−6 and +/−12 dioptres. Such a Fresnel lens may, for example, be injection molded.

The formulations for use as the low or very low index coating composition are preferably those which are suitable for curing by UV irradiation. In a first embodiment the cured coating material preferably has a refractive index (nD) between about 1.45 and about 1.55 and preferably between about 1.38 and about 1.55. In this first embodiment the coating material formulation is chosen so that the difference in the index of refraction between the Fresnel lens blank bulk material and that of the coating material may be greater than 0.05 and preferably greater than 0.15 and as high as 0.40 or more.

Thus, in this embodiment, for an index of refraction (nD) of the Fresnel lens bulk material of 1.60, the index of refraction (nD) of the cured coating material will be less than 1.55 and more preferably less than 1.52, for example about 1.50. Coating materials having such a low index also include (meth)acrylic monomers, epoxy acrylic monomers, polyurethane acrylic monomers, fluoro-acrylic monomers, epoxy monomers and polyurethane monomers and their mixtures.

Two coating formulations suitable for application in this embodiment of the invention are formulations designated 311-83-L and 176-11, whose compositions are as follows:

|  | % by mass |
|---|---|
| Components of formulation 311-83-L |  |
| Alkoxylated cyclohexane dimethanol diacrylate | 49% |
| Ddiethyleneglycol diacrylate | 39% |
| 1,4-functional dentritic polyester acrylate blend | 10% |
| MBOL | 2% |
| Genocure LTM/photoinitiator | 3% |
| Components of formulation 176-11 |  |
| Dipentaerythritol hexaacrylate | 8.7% |
| Dipropylene Glycol Diacrylate | 43.5% |
| Alkoxylated Diacrylate | 17.4% |
| 1,4 Butanediol Diacrylate | 26.1% |
| MBOL | 1.7% |
| Genomer LTM/photoinitiator | 2.6% | where MBOL = 3-methyl-2-buten-1-ol.

Other formulations are of course possible. Such formulations will satisfy the following criteria, high transparency, low yellowness, low shrinkage, low refractive index between about 1.45 and about 1.55 or preferably between about 1.38 and about 1.55, curable by UV irradiation in a period less than 10 min., good mechanical properties such as hardness, toughness, impact resistance, permanent adherence to the structured surface of a Fresnel lens blank, and undelaminatability in normal use. The coated Fresnel lens can furthermore be a conventional prescription or Rx surfaced or digital surfaced to get the desired lens power in association with the non-structured surface of the lens. Other such possible formulations include monomers containing fluoro-acrylic compounds.

Application, and curing, of the coating composition is preferably carried out by the so-called press coating process mentioned above.

Figure 4:
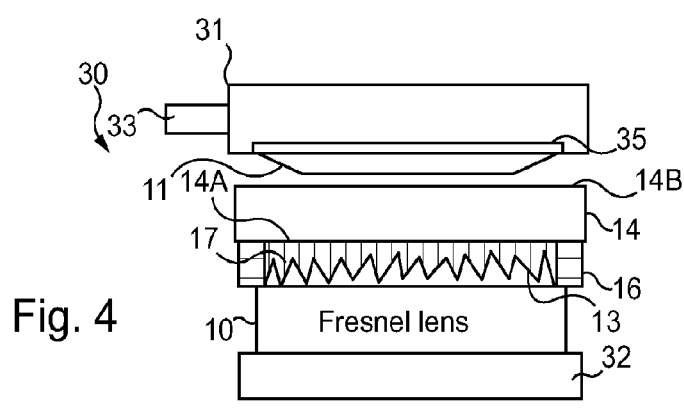
FIG. 4 is highly schematic axial sectional view of an arrangement for press-coating a Fresnel lens blank, in a closed position with the coating resin molded over the Fresnel structure.
Figure 5:
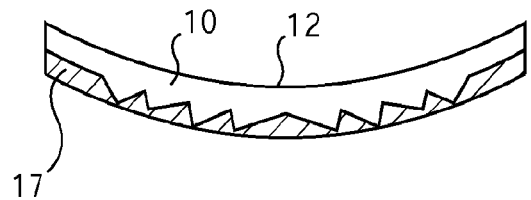
FIG. 5 is the schematic axial sectional view the press-coated Fresnel lens blank after the removal of the mold part.

FIG. 4 illustrates apparatus suitable for carrying out press coating process on the structured surface 13 of a starting Fresnel lens blank 10 according to this first embodiment. The lens blank also has a non-structured surface 12. The Fresnel lens blank 10 is supported on a suitably configured lens blank support 32. The lens blank support 32 is fixed and the lens blank is removably mounted on the support by any suitable fastening means (not shown).

A substantially rigid mold part 14 has a molding surface 14A corresponding to the desired external or exposed surface of the coating and an outer surface 14B facing a press coating apparatus per se. The mold part 14 is made of mold glass composition suitable for molding ophthalmic lenses as is well known in the art. The press coating apparatus 30 for performing press coating comprises a fluid accumulator 31 such as an air accumulator provided with a fluid port, here an air port 33, adapted to be connected to a source of pressurized air or other suitable fluid (not shown) for introducing pressurized fluid into the accumulator and for evacuating the pressurized air from the accumulator. The accumulator may have a flexible membrane or bladder 35 adapted to bear against the side of the mold part surface 14B remote from the molding surface. Finally, a UV lamp 36 is disposed to the side of the Fresnel lens remote from the mold part so that incident UV radiation is directed at the Fresnel lens, and in particular the non-structured surface or side 12 thereof.

Figure 3:
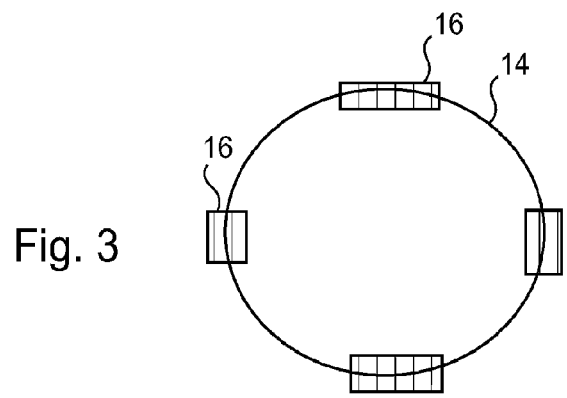
FIG. 3 is a highly schematic top view of the mold part showing a plurality of spacers at the periphery of the mold part for assisting in calibrating the thickness of the coating.

The Fresnel lens blank 10 is mounted on the lens blank support 32 and if desired secured thereto. A plurality of spacers 16, four as illustrated in FIG. 3, and equally angularly spaced 90° from one another also as illustrated, are positioned at the periphery of the Fresnel lens blank 10 and extend in the same direction as the relief pattern or the structured surface 13 of the lens blank. A metered amount of the curable coating composition 17 is deposited on the mold part 14 (see FIG. 1). The metered amount of the coating composition may be deposited for example as a plurality of individual drops.

Pressurized air is then supplied to the fluid accumulator 31 to inflate the inflatable balloon or bladder 35 which applies the desired light pressure to the mold and thereby ensures in association with the spacers 16 that the resulting coating 17 is of the desired thickness. It goes without saying that such spacers in general and tape spacers in particular are optional as are the axial height and location of such spacers; other means may be employed to ensure in association with the light pressure the calibration of the thickness of the coating. After molding the coating composition is cured in situ. The UV source 36 is turned on long enough to ensure the curing of the coating composition. After curing the pressurized air can be exhausted from the accumulator 31 through the air port 33 so that the mold part 14 and spacers 16 can be removed and the Fresnel lens withdrawn from the press coating apparatus.

In accordance with the present invention the low or relatively low refractive index coating on the structured surface of the ophthalmic lens blank, such as a Fresnel lens blank or a refractive and/or diffractive bifocal or other multifocal lens blank, is itself overlain with a film or film stack 20 of suitable purity and quality consistent with optical quality ophthalmic lenses which is relatively rigid and otherwise has suitable mechanical (and of course optical) properties so that the resulting ophthalmic lens blank may be edged in a conventional edging machine. In general a film stack will be preferred to fabricate a polarized ophthalmic lens with a structured surface but a polarized film may also be used. For ophthalmic lens applications not requiring polarization, a relatively rigid film (as opposed to a relatively rigid film stack) will normally suffice.

The relatively rigid film or film stack may have a Young's modulus in the range of about 2,200 and about 5,600 MPa (at 23° C.), for example about 3,300 MPa (at 23° C.) in the case of a TAC film stack.

The relatively rigid polarizing film stack or multilayer film for may comprise an encapsulated PVA (polyvinyl alcohol) layer in particular in the form of a TAC/PVA/TAC stack or multilayer film comprising successive layers of triacetate cellulose (TAC), polyvinyl alcohol (PVA) and triacetate cellulose (TAC), a CAB/PVA/CAB stack or multilayer film comprising successive layers of cellulose acetate butyrate (CAB), polyvinyl alcohol (PVA), and cellulose acetate butyrate (CAB), or a PC/PVA/PC stack or multilayer film comprising successive layers of polycarbonate (PC), polyvinyl alcohol (PVA), and polycarbonate (PC), and polarized polyethylene terephthalate (PET).

Any of the foregoing TAC/PVA/TAC CAB/PVA/CAB, or PC/PVA/PC stacks or multi-layer films or a polarized PET film may be used to fabricate a polarized ophthalmic lens.

Alternatively and notably where the ophthalmic lens to be fabricated is not a polarized ophthalmic lens the relatively rigid film typically will not require a stack or multilayer film structure as above. In this case the relatively rigid film may comprise for example a film of polyethylene terephthalate (PET), a thermoplastic film of polycarbonate (PC) or a thermoplastic film of polyurethane (PU).

Figure 6:
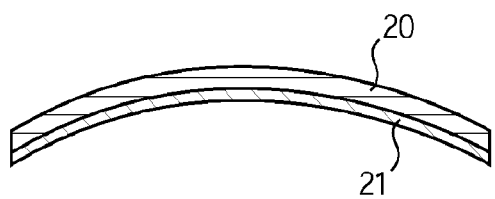
FIG. 6 is a schematic axial sectional view of a pre-formed polarized TAC stack after the application of a hot melt adhesive (HMA)

The selected "inner" surface of such a film or film stack 20 may be coated with a suitable adhesive 21 (see FIG. 6) for securing the film or film stack to the low or very low refractive index coating covering the structured surface of the lens blank. The other or "outer" surface of this film or film stack may receive any coating or coatings (including conventional coatings) suitable for ophthalmic lenses such as for example anti-abrasion, anti-reflection, anti-soiling, anti-static, and/or anti-fogging coatings Various adhesives suitable for use in ophthalmic lenses may be employed for this purpose. The adhesive layer 21 should be of suitable purity and quality to exhibit color transmission and clarity at a level consistent with optical quality ophthalmic lenses. Also, such an adhesive layer should be of "uniform thickness" which as used herein means that its thickness varies less than about 1.0 µm and preferably less about 0.5 µm. Also the thickness of the (dried) adhesive will typically be between about 1.0 and about 30 µm.

An example of a suitable adhesive is a hot melt adhesive (HMA). Such a dried HMA layer was of suitable purity and quality to exhibit color transmission and clarity at a level consistent with optical quality ophthalmic lenses. The dried HMA layer also may be of "uniform thickness" with a thickness which varies less than about 1.0 µm and preferably less about 0.5 µm. The thickness of the dried HMA layer may be between about 1.0 and about 30 µm.

Suitable HMA materials include polyurethane based heat-activatable adhesive materials. Such materials are characterized as aqueous anionic dispersions of high molecular weight polyurethane. One such type of HMA is commercially available from Bayer under trademarks and/or references Dispercoll® U 42 and KA-8758. Another type of HMA is available from Bond Polymers International LLC which commercializes two waterborne polyurethane dispersions available under the trademarks and/or references Bondthane® UD-104 and Bondthane® UD-108.

Optionally the HMA material may be blended with additives to adjust the rheological, mechanical or optical properties thereof. Such additives include, for example, water, colloid silica or surfactant for facilitating crosslinking in order to improve hardness and durability. A suitable colloid is LUDOX® SM-30 colloidal silica, 30 wt. % suspension in $H_2O$. The percentage of colloid in the HMA material may be in the range of 1-20 wt %, and more particularly in a preferred range of 2-10 wt %.

The HMA material suitable for use herein can also be any polymer for formulating a hot melt adhesive, but is preferably a thermoplastic polymer. The HMA polymer may be selected among the group consisting of polyolefins, polyamides, polyurethanes, polyurethane/ureas, polyvinypyrrolidones, polyesters, polyesteramides, poly(oxazolines) and poly(meth)acrylic systems or combinations thereof. Suitable polyolefines are disclosed in particular in U.S. Pat. No. 5,128,388. Preferred polyolefines are block thermoplastic elastomers such as block elastomers comprising polystyrene blocks, polybutadiene blocks, polyisoprene blocks or ethylene-butylene copolymer blocks.

Such HMA material may be used as a single layer deposited on the selected "inner" layer of the film or film stack, or may be combined with another layer of adhesive such as latex system. Such a system comprising a double layer of adhesive (HMA+latex) and is described, for example, in US 2010/0110567. In this double layer of adhesive, the latex could be applied in the surface of the coated Fresnel lens for better adhesion. Processing details for producing a thin, solid double layer of HMA and latex are given below in Examples 5 and 6.

Any other type of adhesive material may be used alternatively, which makes it possible to retain the film on the coated surface of the Fresnel lens. For example it is possible to use thermal adhesive, UV-curable adhesive, or latex adhesive. Alternatively, the adhesive material layer may be deposited on the inner surface of the film or on the coated surface of the Fresnel lens. In some cases, depending of the adhesive material used, respective layers of adhesive material may be deposited on the inner surface of the film or film stack and on the coated surface of the Fresnel lens. The adhesive layer may be deposited on lens or/and on film or film stack using any suitable process, such as spin coating for example.

It is also possible to use as an adhesive a layer of a pressure sensitive adhesive (PSA). In addition, pressure-sensitive adhesives can be deposited in the form of a thin layer of uniform thickness. Such thickness may be comprised between 0.5 and 300 µm. Several pressure-sensitive adhesives may be used in a process according to the invention. Advantageously, the pressure-sensitive adhesive is selected from polyacrylate-based compounds, styrene-based block copolymers and blends incorporating natural rubber. Non-limiting examples of pressure-sensitive adhesives include polyacrylate-based compounds, in particular polymethacrylate-based compounds, ethylene-based copolymers, such as ethylene vinyl acetate, ethylene ethyl acrylate and ethylene ethyl methacrylate copolymers, or synthetic rubber and elastomer-based compounds, including silicones, polyurethanes, styrene-butadienes, polybutadienes, polyisoprenes, polypropylenes, polyisobutylenes, or polymer-based compounds containing nitriles or acrylonitriles, or polychloroprene-based or block copolymer-based compounds that include polystyrene, polyethylene, polypropylene, polyisoprene, polybutadiene, on polyvinylpyrrolidone or vinylpyrrolidone copolymers, or blends (with continuous or discontinuous phases) of the above polymers, and also block copolymers obtained from the above-listed compounds. These pressure-sensitive adhesives may also include one or more additives selected from tackifiers, plasticizers, binders, antioxidants, stabilizers, pigments, dyes, dispersing agents and diffusing agents. For implementing the invention, when using a pressure-sensitive adhesive a polyacrylate-based is preferred. Acrylic PSA designated Nitto CS-9621 (commercialized by Nitto Denko) represented a particularly useful PSA.

In a preferred embodiment, the coated film or film stack 20 may then be applied under suitable pressure conditions to the low or very low refractive index coating 17 covering the structured surface of the ophthalmic lens blank 10. After application of the adhesive layer to the selective TAC film, e.g. by spin coating, the adhesive layer is dried to form a HMA/TAC/PVA/TAC laminate which is then laminated to the low or very low index coating 17 on the Fresnel surface of the coated lens blank 10 in a hot press (not shown) for a suitable period, e.g., 2.5 min. at a suitable set temperature, e.g. about 180° C. and at a suitable pressure, e.g. about 20 psi (or about 138 kPa). The preferred process used to laminate the cured coated film or film stack to the low or very low refractive index coating covering the structured surface of the ophthalmic lens blank is described to US 2009/0165932, which is incorporated herein by reference. The pressure is then released and the resulting laminated, polarized Fresnel lens blank (see FIG. 7) was accessed. The resulting ophthalmic lens may be edged in a conventional edging machine and may be prescription or Rx surfaced or digital surfaced to get the desired lens power in association with the non-structured surface of the lens.

Figures 7, 8, 9:
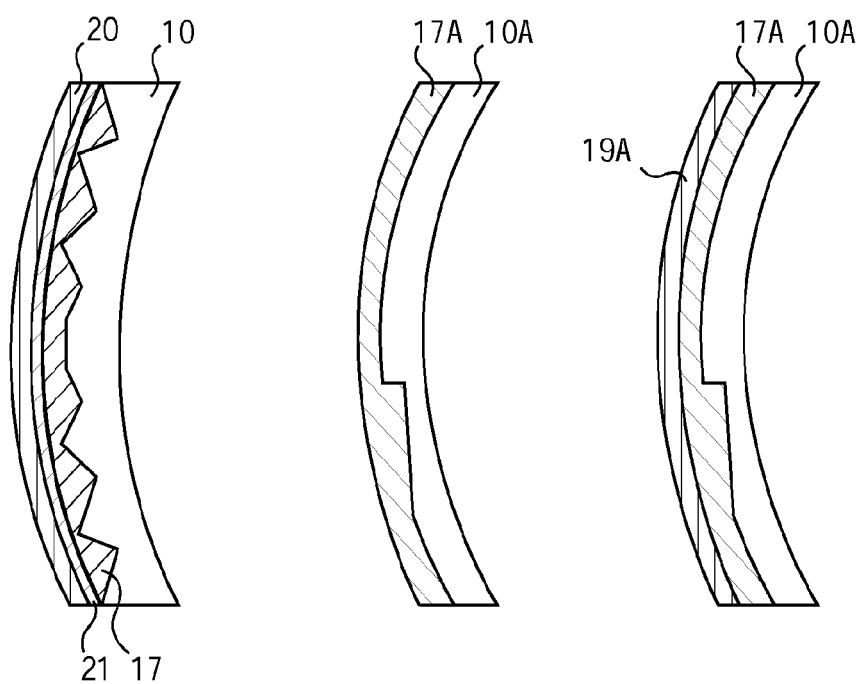
FIG. 7 is a schematic axial section of application of the HMA side of the preformed TAC stack brought into contact with the free face of the coating on the structured surface of a Fresnel lens.
FIG. 8 is a schematic axial section of a press-coated bi-focal lens blank according to another embodiment.
FIG. 9 is a schematic axial section of application of the HMA side of the preformed TAC stack brought into contact with the free face of the coating on the structured surface of the bi-focal lens of FIG. 8.

FIGS. 8 and 9 illustrate another embodiment of the invention where the ophthalmic lens blank is a refractive and/or diffractive bi-focal, tri-focal or other multifocal ophthalmic lens blank. Such bi-focal, tri-focal or other multifocal ophthalmic lenses comprise near and/or middle vision segment(s) of greater optical power than distance vision zone of the same ophthalmic lens. For that purpose the starting lens blank 10A (see FIG. 8) has a structured surface or side with a recess or recesses to accommodate one or more segments of a material having a lower refractive index.

The method used for fabricating such bi-focal, tri-focal or other multifocal ophthalmic lens according to the invention is substantially the same as that used for fabricating the Fresnel lens described in detail above, including various materials used for the lens blank bulk material, the low and very refractive index coating composition, the polarizing or non-polarizing rigid film and film stack. The difference between preceding embodiments and the present embodiment is the configuration and nature of the structured surface which in the preceding embodiments comprised concentric peaks and valleys and the present embodiment simply comprises one or more recesses extending over part of this structured surface, the recess or recessed being the desired near and/or middle vision segments.

FIG. 8 shows a structured surface comprising a recess in the convex curved face of the starting lens blank. It is also shows the coating 17A of the desired low or very low refractive index coating composition as given above and exemplified below and of suitable thickness, for example in the range of 75 µm to 750 µm reckoned from the convex curved face of the lens. The press-coating process is used for applying the coating composition which is thereafter cured in situ. Finally, the relatively rigid film or film stack is provided as disclosed above below and is applied with or without an adhesive to the cured coating on the structured surface of the lens blank as described above and generally in accordance with Examples 5 and 6 below.

In addition post-assembly heating may be employed in order to improve adhesion.

First, examples of the press coating process will now be given.

EXAMPLE 1

A 4.0 base Fresnel lens blank of polycarbonate having a refractive index of 1.59 was injection molded. In the present example the Fresnel structure or the structured surface of the Fresnel lens blank was located on the convex side of a convex-concave lens blank. The Fresnel structure height of the structured surface of the Fresnel lens blank was 150 µm and the optical power of the Fresnel lens design in air was +6.0.

A corresponding 4.0 base glass mold part had a molding surface which matches the base curvature of the Fresnel lens structured surface. So-called spacer tape was used for defining the plurality of spacers between the mold part and the Fresnel lens blank. The spacer tape portions were applied to the edge of the glass mold part at circumferentially spaced locations and also to the edge of the Fresnel lens blank and served to calibrate the thickness of the coating composition in association with the application of light pressure by the air balloon or bladder. In this example spacer tape portions have an axial length of 0.30 mm, slightly greater than the desired thickness of the coating composition.

The coating composition was a UV curable low index coating solution was formulation 311-83-L specified above and as shown in the above table has a refractive index of 1.50 after curing. A metered quantity of a total of 0.9 g of drops of the curable coating solution was deposited onto the molding surface of the glass mold part and then the Fresnel lens blank was carefully brought into contact with the drops of coating solution such that the coating solution spread over the entire lens mold surface.

A light air balloon or bladder pressure of about 2 to 3 psi (or about 13.8 to 20.7 kPa) was applied to the non-structured surface of the Fresnel lens for better control of the thickness of the coating.

UV radiation from a Dymax UV lamp was then directed for 1 to 2 min. at the non-structured surface of the Fresnel lens side to cure the coating composition in situ. After UV curing of the coating composition, the glass mold part and spacers were removed to access and withdraw the coated Fresnel lens. The removal of the spacers from the lens blank at this point is optional in that they are located in the unused peripheral region of the lens blank which is in any event removed to adapt the lens blank to a particular eyeglass frame, in particular in the course edging.

The coating thickness was about 250 µm, reckoned from the 'free face' or peaks of the structured surface of the Fresnel lens. The coated lens provided a very good optical image and the surface roughness (Rq) of the coated Fresnel lens surface was less than 200 nm. The coating composition filled the spaces between the ridges of the structured surface and contained no trapped air bubbles or voids when checked by naked eye and microscopy. Nor were there any ring void defects or other visible defects. The coated Fresnel lens had a Fresnel power of +1.0. The resulting coated Fresnel lens blank was fully compatible with conventional prescription or Rx surfacing or digital surfacing and edging, and hard-coating desiderata for obtaining the desired eyeglass lens prescription.

EXAMPLE 2

The modalitites of this example were the same as those of Example 1, except as regards the axial length of the spacer tape portions which was approximately 650 µm to obtain a coating thickness of about 620 µm. The surface quality of the much thicker coating of Example 2 is even better than that of Example 1. The surface roughness was less than 100 nm and the optical quality was good, too.

EXAMPLE 3

The modalities of this example were the same as those of Example 1, except that the Fresnel lens bulk material is a high index polythiourethane (nD=1.60). The polythiourethane lens blank is of the same design as the polycarbonate Fresnel lens of Examples 1 and 2. The resulting coated Fresnel lens blank produced the press coating process had the same good optical and cosmetic qualities as coated lens blank of Example 1.

EXAMPLE 4

The modalities of this example were the same as those of Example 1, except the polycarbonate Fresnel lens blank had a lower Fresnel structure height of 80 µm and the axial length of the spacer tape was 0.25 mm or 250 µm. The coating thickness obtained by the press coating process was about 240 µm. The coated Fresnel lens blank had very good optical and cosmetic qualities. The Fresnel power was again +1.0.

A table 1 summarizes various parameters of Examples 1 to 4.

TABLE 1

| Example | Lens | Fresnel structure height | Coating liquid | Coating mass | Spacer thickness | Air balloon pressure | UV direction | UV lamp | Coating thickness | Coated Surface roughness (Height) | Coated Surface roughness (Width) | Optical visual Quality | Coating cosmetic Quality |
|---|---|---|---|---|---|---|---|---|---|---|---|---|---|
| Ex. 1 | PO | 120 µm | 1.6 | 0.9 g | 300 µm | 9 psi | Incident UV at Fresnel lens | Dymax | 350 µm | <200 nm | >150 µm | Good | Good |
| Ex. 2 | PO | 120 µm | 1.8 | 0.0 g | 600 µm | 4 psi | Incident UV at Fresnel lens | Dymax | 620 µm | <100 nm | >1000 µm | Good | Good |
| Ex. 3 | PO | 120 µm | 1.5 | 0.9 g | 300 µm | 3 psi | Incident UV at Fresnel lens | Dymax | 300 µm | — | — | Good | Good |
| Ex. 4 | PO | 80 µm | 1.6 | 0.45 g | 160 µm | 3 psi | Incident UV at Fresnel lens | Dymax | 240 µm | <200 nm | >150 µm | Good | Good |

Example 5 which follows is an example for carrying out the present invention for use in fabricating a polarized Fresnel lens blank.

EXAMPLE 5

This example included the two main processing stages. The first main processing stage comprises coating a Fresnel structure of a Fresnel lens blank with a low refractive index coating material according to the modalities of Example 1. The Fresnel lens blank was an injection molded lens blank made of polycarbonate and the coating resin or material had a low refractive index (1.504 after curing)

The second main processing stage comprised laminating a relatively rigid polarized film stack or multilayer film on to the low index coating of the coated Fresnel lens blank. The relatively rigid polarized film stack had mechanical properties suitable for enabling the resulting polarized Fresnel lens blank to be edged in a conventional edging machine.

The polarized TAC film stack was provided a multilayer film comprising a TAC/PVA/TAC stack that is a multilayer film of triacetate cellulose (TAC) bonded to either side of a polyvinyl alcohol layer. Such a TAC/PVA/TAC film stack is known per se. A double adhesive layer comprising a first layer of latex and a second layer of a hot melt adhesive (HMA) material was spinned to the selected TAC layer. The thickness was about 1.0 and about 30 µm and thickness varied less than about 1.0 µm and preferably less about 0.5 µm.

After the application and drying of the double adhesive layer comprising a layer of hot melt adhesive (HMA)

(Bondthane® UD 108) and a latex layer solution (a W-234 based urethane latex available Baxenden), the resulting HMA/latex/TAC/PVA/TAC laminate was then laminated to the low index coating on the Fresnel surface of the coated lens blank in a hot press for 2.5 min. at a set temperature of 180° C. and a pressure 20 psi (138 kPa). The pressure was released and the resulting laminated, polarized Fresnel lens blank was accessed. The Fresnel lens blank had a Fresnel power of +1.0. The surface of the lens blank overlying the Fresnel structure comprised by the selected TAC layer of the laminated polarized film was very smooth and had a very good optical surface thank to the optical grade TAC film surface. The resulting polarized Fresnel lens blank had good cosmetic appearance and the Fresnel structure was hardly visible thanks to the polarized color film.

Example 6 which follows is an example for carrying out the present invention for use in fabricating a polarized Fresnel lens blank having structured surface coated with a very low reftractive index coating having unsatisfactory mechanical properties

EXAMPLE 6

The modalitites of this example were essentially the same as those of Example 5, except as regards the coating solution. The UV curable solution used for coating the Fresnel structure had a very low index when cured such as a UV curable fluorine based coating solution and in particular a UV curable fluorine acrylic based coating solution MY-1375 available from MY-Polymer, Ltd which has a refractive index of 1.38 after curing. The UV curable composition was applied to the glass mold part to coat the structured surface of the Fresnel lens structure. The Fresnel lens structure was then carefully applied against the low index liquid solution with a pressure in the range of 2 to 3 psi (or about 13.8 to 20.7 kPa). The UV curable composition was then fully cured by UV light through the unstructured surface of the Fresnel lens structure for 30 seconds to obtain the cured coating. The cured coated Fresnel lens blank was then separated from the glass mold part. The resulting coating had a free thickness of about 200 μm, that is a thickness reckoned from the peaks of the structured surface. The resulting optical power of the coated Fresnel lens blank (determined by Nidek Lensmeter LN-1200) was +3.00 thanks to the larger difference in the refractive indexes of the polycarbonate (nD=1.59) and MY-1375 (nD=1.38).

Such a very low refractive index coating material can be qualified as "soft" and in general does not have good mechanical properties suitable for use as ophthalmlic lens surface including an ophthalmic lens surface of a polarized ophthalmic, even after the application of a conventional hardcoat.

However, when the rigid polarized film stack (of Example 5) was laminated on to this very low index layer coating surface as described above, a very good polarized, laminated Fresnel lens was obtained with improved Fresnel power and a rigid surface thanks to the outer TAC film of the laminated rigid TAC/PVA/TAC film stack. The resulting Fresnel power was +3.0 on the same Fresnel design as that of Example 1. The resulting polarized Fresnel lens blank could be edged in a conventional edging machine without delamination. The resulting edged Fresnel lens had good cosmetic appearance and its Fresnel structure was hardly seen thanks to the polarized color film.

COMPARATIVE EXAMPLE 1

The modalities of Example 5 were repeated without the first stage, namely without press-coating the structured surface of the Fresnel lens with a low (or very low) refractive index coating material.

The polarized TAC film was laminated directly on to a structured surface of the polycarbonate Fresnel lens blank described above. The adherence of the polarized film to the structured surface of the Fresnel lens blank was poor. The resulting laminated Fresnel lens blank could not be edged in a conventional edging machine nor could it undergo conventional Rx or prescription processing. Also, the optical image obtained with the resulting polarized, laminated Fresnel lens blank was not satisfactory as there were voids or gaps between the structured surface of the Fresnel lens blank and the polarized TAC film which in Example 5 according to the invention are filled in with the low index coating material.

COMPARATIVE EXAMPLE 2

The modalitites of this example were essentially the same as those of Example 6, except that no film or film stack was laminated to the very low refractive index colating.

This very low index coating which can be qualified as "soft" has mechanical properties which are considered insufficient for use as a surface of an ophthalmic lens blank that has to be edged in a conventional edging machine, later mounted in a eyeglass frame and capable of withstanding normal use and service. Indeed this example was carried without laminating a rigid film or film stack on the free face of the very low index coating. The resulting Fresnel lens had same Fresnel power of +3.0, but the surface defined by the very low refractive index coating had unsatisfactory mechanical properties in particular it was unacceptably soft. A hard coat (HC) was applied to the very low refractive index in accordance normal hardcoating processing but the resulting hardocated surface still had unsatisfactory mechanical properties and in particular it was too soft for use as an eyeglass or sunglass lens.

COMPARATIVE EXAMPLE 3

Example 5 was again carried out but this time, in a one step process wherein, the polarized TAC/PVA/TAC film stack was applied to the uncured coating material to produce the polarized, laminated lens blank comprising the Fresnel lens blank, the press-coated low index coating material on the structured surface, and the rigid polarizing film stack were otherwise as described above. After application of the rigid polarizing film stack to the coating material, the coating material was cured with UV irradiation. The resulting polarized Fresnel lens blank had considerable surface deformation due to UV curing of the coating material while in contact with the rigid polarizing film.

Another advantage of the present invention is the ability to provide very thin, high quality lenses compared with conventional prescription lenses fabricated with the same substrate bulk material. The following Table 2 illustrate this great advantage:

TABLE 2

| Design | Lens Substrate Material | Low Index Coating with Press Coating Process | Polarized Film TAC/PVA/TAC With HMA | Hard-Coat Coating | Power | Diameter | Total Center thickness | Total Edge thickness |
|---|---|---|---|---|---|---|---|---|
| Unifocal Lens | Stylis ® Material | Not applicable | Film lamination (as Example 5) | Coating 1 | (−) 3.9 | 60 mm | 1.6 mm | 5.0 mm |
| Fresnel lens | Stylis ® Material | MY-1375 ($n_D$ = 1.38) | Film lamination (as Example 5) | Coating 1 | (−) 4.2 | 60 mm | 2.2 mm | 2.0 mm |
| Unifocal lens | Polycarbonate | Not applicable | Film lamination (as Example 5) | Coating 1 | (+) 4 | 60 mm | 5.2 mm | 2.0 mm |
| Fresnel lens | Polycarbonate | MY-1375 ($n_D$ = 1.38) | Film lamination (as Example 5) | Coating 1 | (+) 4 | 60 mm | 3.0 mm | 1.6 mm |

In this table a conventional unifocal lens for correcting myopia (negative power) or hypermetropia (positive power) with a laminated polarized film stack of TAC/PVA/TAC and a spin-coated HMA layer/latex layer (as described in Example 5) is compared with Fresnel lenses fabricated in accordance with Example 6 and having respectively a similar negative power, and the same positive power.

In Table 2, the Stylise material is a thermoset polythiourethane polymer (nD=1.67) commercialized by Essilor International, The polycarbonate is a thermoplastic polycarbonate with a refractive index of 1.59. Coating 1 was a conventional hard-coating that is an anti-abrasive coating, used in ophthalmic lens industry. This coating was a bi-layer coating obtained by the process described in Example 3 of EP 0 614 957

To compare lenses with negative power the most important criterion is the thickness at the edge of the lens. For unifocal lenses, when implementing the present invention, the thickness at the edge of the lens is reduced by more than 50%. For lenses with positive power, the reduction in thickness is always very significant at edge of the lens and also at the center of the lens, with Fresnel lenses fabricated according to the present invention.

The present invention is not intended to be limited to the embodiments described herein but on the contrary is intended to extend to the fabrication of polarized or nonpolarized Fresnel and refractive and/or diffractive bi-focal or other multifocal ophthalmic lenses having a structured surface coated with a low or very low refractive index coating material to which a relatively rigid and smooth film or film stack is laminated or bonded and the resulting laminated polarized or nonpolarized coated Fresnel or lens refractive and/or diffractive bi-focal or other multifocal ophthalmic lenses, within the scope of the appended claims.

The invention claimed is:

1. A method for fabricating an ophthalmic lens, comprising:
   providing a lens blank made of a transparent optical quality material, the lens blank having a structured surface and a non-structured surface, the structured surface having a base curvature, the structured surface being defined by a plurality of peaks and valleys;
   applying a resin coating to the structured surface of the lens blank so that the resin coating covers the structured surface and has a smooth free surface with a curvature corresponding to the base curvature of the structured surface;
   curing the resin coating in situ on the lens blank in a mold part with a UV lamp, wherein a material of the resin coating has a refractive index is between about 1.38 and about 1.55;
   providing a rigid film or film stack; and
   laminating or bonding the film or film stack to the resin coating, wherein,
   a) the UV lamp is disposed on the side of the lens blank remote from the mold part, and not on a mold side, and is configured to emit incident UV radiation which is directed at the non-structured surface of the lens blank, and
   b) successively, the rays of the incident UV radiation first pass through the non-structured surface of the Fresnel lens blank, which is opposite the structured surface of the Fresnel lens blank, then the rays of reach the valleys of the structured surface of the Fresnel lens blank before reaching the resin coating, then the rays reach and cure the resin coating, and then the rays pass through the transparent mold part at the opposite of the non-structured surface.

2. The method for fabricating an ophthalmic lens according to claim 1, wherein the laminating or bonding step includes application of an adhesive to the film or film stack and application of pressure to the film or film stack brought into contact with the cured resin coating.

3. The method for fabricating an ophthalmic lens according to claim 2, wherein the adhesive is a hot melt adhesive (HMA) dried before it is brought into contact with the resin coating.

4. The method for fabricating an ophthalmic lens according to claim 3, wherein the hot melt adhesive comprises polyurethane based heat-activatable adhesive materials.

5. The method for fabricating an ophthalmic lens according to claim 4, wherein the hot melt adhesive is selected from the group consisting of polyolefins, polyamides, polyurethanes, polyurethane/ureas, polyvinypyrrolidones, polyesters, polyesteramides, poly(oxazolines) and poly(meth) acrylic systems and combinations thereof.

6. The method for fabricating an ophthalmic lens according to claim 2, wherein the adhesive is a pressure sensitive adhesive (PSA).

7. The method for fabricating an ophthalmic lens according to claim 2, wherein the adhesive comprises a bi-layer system comprising a layer of a hot melt adhesive and a layer of latex.

8. The method for fabricating an ophthalmic lens according to claim 1, wherein the film stack is a polarizing film stack for producing a polarized ophthalmic lens blank.

9. The method for fabricating an ophthalmic lens according to claim 1, wherein the lens blank is a Fresnel lens blank having a Fresnel structure height on the structured surface.

10. The method for fabricating an ophthalmic lens according to claim 9, wherein the Fresnel structure height is between about 20 µm and about 500 µm.

11. The method for fabricating an ophthalmic lens according to claim 9, wherein a thickness of the coating is greater than 1.5 times the Fresnel structure height and less than 5 times the Fresnel structure height.

12. The method for fabricating an ophthalmic lens according to claim 9, wherein the Fresnel structure height is between about 20 µm and about 300 µm.

13. The method for fabricating an ophthalmic lens according to claim 12, wherein the thickness of the resin coating is between about 1.5 times the Fresnel structure height and about 3 times the Fresnel structure height.

14. The method for fabricating an ophthalmic lens according to claim 9, wherein a refractive index of a bulk material of the Fresnel lens blank is between about 1.59 and about 1.74.

15. The method for fabricating an ophthalmic lens according to claim 1, wherein the thickness of the resin coating is between about 75 and 750 µm.

16. The method for fabricating an ophthalmic lens according to claim 1, wherein a difference in the refractive indexes of a bulk material of the lens blank and the material of the cured resin coating is greater than about 0.05.

17. The method for fabricating an ophthalmic lens according to claim 1, wherein a difference in the refractive indexes of a bulk material of the lens blank and the material of the cured resin coating is greater than about 0.15.

18. The method for fabricating an ophthalmic lens according to claim 1, wherein materials of resin coating formulations for producing the resin coating comprise UV curable compounds selected from the group consisting of UV curable (meth)acrylic compounds, epoxy acrylic compounds, epoxy compounds, polyurethane acrylic compounds, fluoroacrylic compounds and any mixture of the aforesaid compounds.

19. The method for fabricating an ophthalmic lens according to claim 1, wherein a bulk material of the lens blank comprises a thermoplastic polycarbonate or a thermosetting polymer obtained by curing compounds selected from thiourethane group(s) and/or episulfur group(s).

20. The method for fabricating an ophthalmic lens according to claim 1, wherein the rigid film or film stack comprises a film stack or multilayer film encapsulating PVA (polyvinyl alcohol) layer between rigid films, the PVA layer being a polarizing layer.

21. The method for fabricating an ophthalmic lens according to claim 20, wherein the film stack comprises a TAC/PVA/TAC film stack.

22. The method for fabricating an ophthalmic lens according to claim 1, wherein the rigid film or film stack comprises a film stack selected from the group consisting of TAC/PVA/TAC film stacks, CAB/PVA/CAB film stacks, PC/PVA/PC film stacks and polarized PET films.

23. The method for fabricating an ophthalmic lens according to claim 1, wherein the film or film stack comprises a rigid film selected from the group consisting of polyethylene terephthalate (PET) films, thermoplastic polycarbonate (PC) films and thermoplastic polyurethane (PU) films.

24. The method for fabricating an ophthalmic lens according to claim 1, wherein the lens blank is one of the group consisting of a Fresnel lens blank, a refractive bi-focal lens blank, a diffractive bi-focal lens blank, and a multi-focal lens blank.

25. A method for fabricating an ophthalmic lens, comprising:
providing a lens blank made of a transparent optical quality material, the lens blank having a structured surface and a non-structured surface, the structured surface having a base curvature, the structured surface being defined by a plurality of peaks and valleys;
applying a resin coating to the structured surface of the lens blank so that the resin coating covers the structured surface and has a smooth free surface with a curvature corresponding to the base curvature of the structured surface;
curing the resin coating in situ on the lens blank in a mold part with a UV lamp to produce cured resin coating material with a refractive index lower than a refractive index of a bulk material of the lens blank;
providing a film; and
laminating the film to the resin coating, wherein,
a) the UV lamp is disposed on a side of the lens blank remote from the mold part, and not on a mold side, and the UV lamp is configured to emit incident UV radiation which is directed at the non-structured surface of the lens blank, and
b) successively, the rays of the incident UV radiation first pass through the non-structured surface of the Fresnel lens blank, which is opposite the structured surface of the Fresnel lens blank, then the rays of reach the valleys of the structured surface of the Fresnel lens blank before reaching the resin coating, then the rays reach and cure the resin coating, and then the rays pass through the transparent mold part at the opposite of the non-structured surface.

26. The method for fabricating an ophthalmic lens according to claim 25, wherein,
the lens blank is a Fresnel lens blank,
the refractive index of the cured resin coating material is between 1.38 and 1.55, and
a refractive index of the bulk material of the Fresnel lens blank is between 1.59 and 1.74.

27. The method for fabricating an ophthalmic lens according to claim 25, wherein,
the lens blank is a Fresnel lens blank,
a difference in a refractive index of a bulk material of the Fresnel lens blank and the refractive index of the cured resin coating material is greater than 0.15.

* * * * *